(12) United States Patent
Dasari et al.

(10) Patent No.: US 9,916,476 B2
(45) Date of Patent: Mar. 13, 2018

(54) MAINTAINING CRYPTOPROCESSOR TYPES IN A MULTINODE ENVIRONMENT

(71) Applicant: LENOVO ENTERPRISE SOLUTIONS (SINGAPORE) PTE. LTD., Singapore (SG)

(72) Inventors: Shiva R. Dasari, Austin, TX (US); Douglas R. Oliver, Round Rock, TX (US); Wen Wei Tang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/839,383

(22) Filed: Aug. 28, 2015

(65) Prior Publication Data

US 2017/0061163 A1 Mar. 2, 2017

(51) Int. Cl.
- G06F 21/00 (2013.01)
- G06F 21/72 (2013.01)
- G06F 21/57 (2013.01)

(52) U.S. Cl.
CPC .............. G06F 21/72 (2013.01); G06F 21/57 (2013.01)

(58) Field of Classification Search
CPC .................................. G06F 21/72; G06F 21/57
See application file for complete search history.

(56) References Cited

U.S. PATENT DOCUMENTS

| | | | | |
|---|---|---|---|---|
| 6,041,035 A * | 3/2000 | Thedens | .............. | G08G 5/0013 340/2.1 |
| 6,748,525 B1 * | 6/2004 | Hubacher | ............. | G06F 9/4416 709/220 |
| 7,900,037 B1 * | 3/2011 | Fallone | ................... | G06F 9/445 711/163 |
| 8,966,027 B1 * | 2/2015 | Brandwine | ......... | G06F 9/45533 709/200 |
| 8,971,173 B1 * | 3/2015 | Choudhury | ........... | H04L 47/125 370/216 |
| 9,740,472 B1 * | 8/2017 | Sohi | .......................... | G06F 8/65 |
| 2001/0056461 A1 * | 12/2001 | Kampe | ............... | H04L 12/2602 709/201 |
| 2003/0074388 A1 * | 4/2003 | Pham | .................... | H04L 49/254 718/106 |
| 2003/0074473 A1 * | 4/2003 | Pham | ...................... | H04L 29/06 709/246 |
| 2003/0233535 A1 * | 12/2003 | Nunn | .................... | G06F 9/4408 713/1 |
| 2004/0205779 A1 * | 10/2004 | Almeida | ................... | G06F 8/65 719/321 |
| 2004/0215949 A1 * | 10/2004 | Dennis | .................. | G06F 9/4408 713/1 |
| 2005/0027977 A1 * | 2/2005 | Taylor | ................... | G06F 9/4408 713/2 |
| 2006/0026422 A1 * | 2/2006 | Bade | ..................... | H04L 63/104 713/164 |
| 2006/0053216 A1 * | 3/2006 | Deokar | ............... | G06F 21/6218 709/223 |

(Continued)

*Primary Examiner* — David Garcia Cervetti
(74) *Attorney, Agent, or Firm* — Brandon C. Kennedy; Jason A. Friday; Kennedy Lenart Spraggins LLP

(57) ABSTRACT

Maintaining cryptoprocessor types in a multinode system includes receiving a selection of a cryptoprocessor type; identifying, within a multinode system, a node having a cryptoprocessor of the selected cryptoprocessor type; and designating the node having the cryptoprocessor of the selected cryptoprocessor type as a primary node for the multimode system.

16 Claims, 5 Drawing Sheets

(56) References Cited

U.S. PATENT DOCUMENTS

| | | | | |
|---|---|---|---|---|
| 2007/0260545 A1* | 11/2007 | Bade | G06F 21/575 | 705/51 |
| 2007/0288740 A1* | 12/2007 | Dale | G06F 9/4405 | 713/2 |
| 2007/0288762 A1* | 12/2007 | Dale | G06F 9/4406 | 713/189 |
| 2008/0046714 A1* | 2/2008 | Suganthi | H04L 63/0428 | 713/150 |
| 2008/0046717 A1* | 2/2008 | Kanekar | H04L 63/166 | 713/156 |
| 2008/0046727 A1* | 2/2008 | Kanekar | H04L 63/166 | 713/168 |
| 2008/0052533 A1* | 2/2008 | Iida | H04L 12/4641 | 713/189 |
| 2008/0098113 A1* | 4/2008 | Hansen | H04L 63/0254 | 709/226 |
| 2008/0109647 A1* | 5/2008 | Gavens | G06F 8/65 | 713/2 |
| 2008/0109798 A1* | 5/2008 | Gavens | G06F 8/65 | 717/168 |
| 2009/0300349 A1* | 12/2009 | Hashimoto | H04L 63/0485 | 713/156 |
| 2010/0125731 A1* | 5/2010 | Dasari | G06F 9/5061 | 713/155 |
| 2010/0162036 A1* | 6/2010 | Linden | G06F 11/181 | 714/4.11 |
| 2011/0225428 A1* | 9/2011 | Stufflebeam, Jr. | G06F 21/72 | 713/189 |
| 2011/0225431 A1* | 9/2011 | Stufflebeam, Jr. | G06F 21/62 | 713/190 |
| 2012/0110055 A1* | 5/2012 | Van Biljon | G06Q 30/04 | 709/201 |
| 2013/0081100 A1* | 3/2013 | Sreehari | G06F 15/16 | 726/1 |
| 2013/0152191 A1* | 6/2013 | Bright | H04L 63/02 | 726/14 |
| 2014/0040605 A1* | 2/2014 | Futral | G06F 9/445 | 713/2 |
| 2015/0234722 A1* | 8/2015 | Wei | G06F 11/2033 | 714/4.11 |
| 2015/0234845 A1* | 8/2015 | Moore | G06F 17/30094 | 707/747 |
| 2015/0234846 A1* | 8/2015 | Moore | G06F 17/30097 | 707/747 |
| 2015/0294119 A1* | 10/2015 | Gundam | G06F 9/441 | 713/2 |
| 2016/0191504 A1* | 6/2016 | Kim | H04W 12/06 | 726/6 |
| 2016/0283715 A1* | 9/2016 | Duke | G06F 21/566 | |
| 2016/0323378 A1* | 11/2016 | Coskun | G06F 9/4451 | |
| 2016/0344711 A1* | 11/2016 | Rokui | H04L 9/0833 | |

* cited by examiner

US 9,916,476 B2

MAINTAINING CRYPTOPROCESSOR TYPES IN A MULTINODE ENVIRONMENT

BACKGROUND OF THE INVENTION

Field of the Invention

The field of the invention is data processing, or, more specifically, methods, apparatus, and products for maintaining cryptoprocessor types in a multinode system.

Description of Related Art

Modern computing systems may be embodied as multinode systems, with a plurality of nodes operating to provide a computing environment. Certain secure multinode systems include nodes with one or more dedicated cryptoprocessor(s). Each cryptoprocessor may have one or more associated cryptoprocessor type(s). In certain secure multinode systems, design parameters may be focused on performance considerations.

SUMMARY OF THE INVENTION

Methods, apparatus, and products for maintaining cryptoprocessor types in a multinode system are described in this specification. Such maintenance includes receiving a selection of a first cryptoprocessor type; identifying, within a multinode system, a node having a cryptoprocessor of the first cryptoprocessor type; and designating the node having the cryptoprocessor of the first cryptoprocessor type as a primary node for the a multinode system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
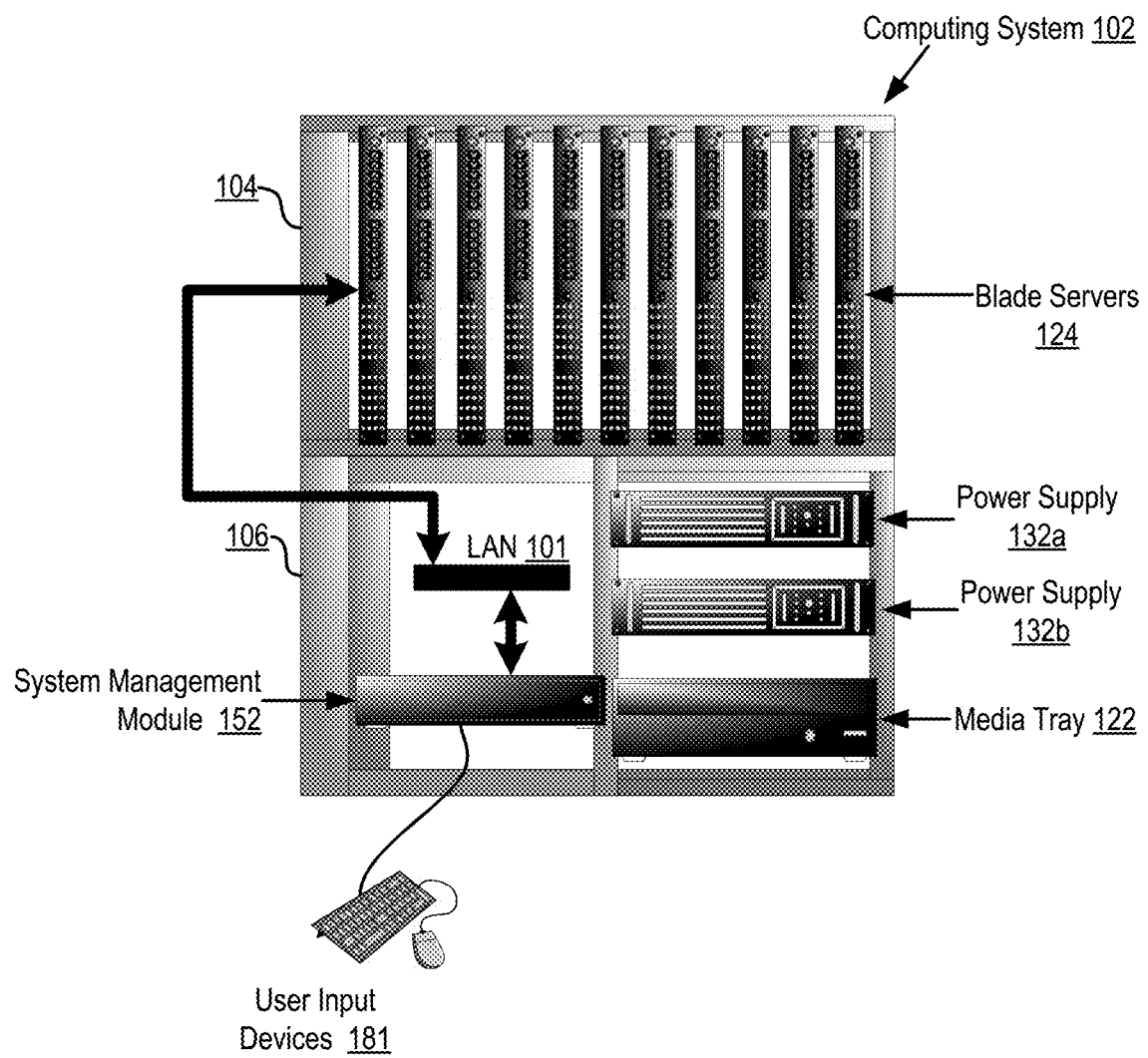
FIG. 1 sets forth a diagram of an example computing system in which maintaining cryptoprocessor types in a multinode system may be implemented, according to embodiments of the present disclosure.

Example methods, apparatuses, and products for maintaining cryptoprocessor types in a multinode system in a computing system in accordance with the present disclosure are described with reference to the accompanying drawings, beginning with FIG. 1. For the purposes of this disclosure, a "node" may be any computing resource that includes a dedicated cryptoprocessor. A "cryptoprocessor," for the purposes of this disclosure, may include any embedded microprocessor, microcontroller, application-specific integrated circuit, or other semiconductor device for executing computer program instructions, where the semiconductor device is dedicated to carrying out cryptographic operations for the node.

For the purposes of this disclosure, a "multinode system" includes any computing system in which a plurality of nodes is deployed, with one node assigned as the primary node. Each node in the multinode system may have a cryptoprocessor of a designated cryptoprocessor type. A "cryptoprocessor type," for the purposes of this disclosure, may include one of a plurality of cryptoprocessor standards. Trusted Platform Module ("TPM") and Trusted Cryptography Module ("TCM") are common example cryptoprocessor types. Readers of skill in the art will recognize that other types of cryptoprocessor may exist now or in the future, and any such type is well within the scope of the present disclosure. Further, for the purposes of this disclosure, different versions of a cryptoprocessor standard may be referred to as different cryptoprocessor types. For example, for the purposes of this disclosure, TPM version 1.2 ("TPM v1.2") and TPM version 2.0 ("TPM v2") may be referred to as different cryptoprocessor types.

In a multinode system, different nodes may include different cryptoprocessor types. In some embodiments, a node may switch between or among different cryptoprocessor types. For example, a switch between TPM v1.2 and TPM v2 may be accomplished via a firmware update (or other type of update) to the cryptoprocessor of a given node. However, given the nature and function of cryptographic processors, the number of updates may be limited. For example, some cryptoprocessor vendors limit the number of flash updates. To reduce the possibility of a cryptoprocessor of a single node being updated to the maximum number of allowable updates, a system administrator may limit the number and types of updates to a cryptoprocessor in the multinode system. In such a configuration, a multinode system may include nodes with different cryptoprocessor types. In other configurations, different cryptoprocessor types may be present due to inclusion of nodes with different origin cryptoprocessor types (e.g., a node with TPM v2 and a node with TCM).

In multinode systems including different cryptoprocessor types, certain known multinode management processes make use only of the cryptoprocessor type of the primary node, where the primary node is chosen based on criteria other than the type of cryptoprocessor included in the primary node. If the type of the cryptoprocessor of the primary node fails to meet certain criteria, then the cryptoprocessor type of the primary node may be changed. For example, in some prior art configurations, a primary node of a multinode system may have a cryptoprocessor type of TPM v2.0. However, a user may select that TCM be utilized as the cryptoprocessor type for the multinode system. In such an embodiment, rather than selecting another node in the multinode system that does have a cryptoprocessor type of TCM, the prior art multinode system is configured to modify the cryptoprocessor type of the primary node to TCM. Such configurations give no thought to retaining other cryptoprocessor types in a multinode system.

Different types of nodes may be included in a multinode system with different nodes having different cryptoprocessor types. By maintaining cryptoprocessor types in a multinode environment, multinode systems maintain flexibility for future use while protecting cryptoprocessors from unnecessary (or prohibited) upgrades.

FIG. 1 sets forth a diagram of an example computing system (102) in which maintaining cryptoprocessor types in a multinode system may be implemented, according to embodiments of the present disclosure. One or more computing system(s) (102) may be configured to operate as a multinode system, in accordance with certain embodiments of the present disclosure. The computing system (102) of FIG. 1 includes a plurality of integrated technology elements ("ITEs") that can receive power from a plurality of power supplies (132a, 132b). Each ITE represents a computing component such as a storage device, a blower, a blade server (124), or other power consuming computing component of the computing system (102). In some embodiments, any of the blade servers may also host one or more virtual machines. The example system of FIG. 1 may be multinode in that each of the blade servers may be an individual node or such a virtual machine may be an individual node. That is, a node in a multinode system may be any module (virtually abstracted or physical) having a cryptoprocessor (virtually abstracted or physical) and computer memory (virtually abstracted or physical). In some embodiments, for example, blade servers may be coupled for multinode communications via a data communications connection such as a QPI (Quick Path Interconnect) scalability link.

The ITEs depicted in FIG. 1 can receive power from a plurality of power supplies (132a, 132b). Each power supply (132a, 132b) in FIG. 1 is a device that supplies electric power to an electrical load. Each power supply (132a, 132b) may be embodied, for example, as a switched mode power supply that transfers power from a source such as main power to a load such as the ITEs, while converting voltage and current characteristics.

The computing system (102) of FIG. 1 is depicted as a chassis environment. In the example of FIG. 1, the chassis environment is implemented as a particular type of computer equipment rack, a blade server system. Readers of skill in the art will recognize that maintaining cryptoprocessor types in accordance with embodiments of the present invention may be carried out in many different multinode environments. While FIG. 1 depicts a blade server system, other systems, such as rack unit chassis and the like may be utilized. The blade server system in the example depicted in FIG. 1 is installed in a two-bay chassis (104, 106) and includes one or more blade servers (124), one or more system management modules (152), one or more media trays (122), and one or more power supplies (132a, 132b). The computing system (102) of FIG. 1 therefore includes a plurality of ITEs, illustrated in this example as blade servers (124), the system management module (152), and the media tray (122), although readers will appreciate that in other embodiments additional ITEs may be included in the computing system (102), where each additional ITE can be embodied as any power consuming computing component of the chassis environment. In some embodiments, one or more management server(s) may be resident on one or more ITEs such as the blade server(s) (124).

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (281) that are not generally connected directly to the blade servers (124) or to the chassis itself.

In some embodiments, the system management module (152) of FIG. 1 may be a separate computing device, managing one or more ITEs such as blade server(s) (124). In the same or alternative embodiments, the system management module (152) of FIG. 1 may be an integral part of one or more ITEs such as blade server(s) (124). In some embodiments, the system management module (152) of FIG. 1 may be configured to maintain cryptoprocessor types in the example multinode system of FIG. 1 by: receiving a selection of a first cryptoprocessor type; identifying, within a multinode system, a node having a cryptoprocessor of the first cryptoprocessor type; and designating the node having the cryptoprocessor of the first cryptoprocessor type as a primary node for the multinode system as described in more detail below with reference to FIGS. 2-5. In some embodiments, maintaining cryptoprocessor types may be carried out by on one or more of the ITEs of computing system (102) such as the blade server(s) (124), as described in more detail below with reference to FIGS. 2-5.

Readers of skill in the art will recognize that a multinode system may include any number of nodes. In an 8 socket system, seven nodes are non-primary nodes and one is a primary. In a 16 socket system, fifteen nodes are non-primary nodes and one is a primary.

The computing system (102) of FIG. 1 also includes one or more blade servers (124). As mentioned above, blade servers are only one example of a node of a multinode system. Other servers, virtual machines, and the like may also be included in a multinode system. The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ("LAN") (101), which may be embodied as a small network installed within the computing system (102). In some embodiments, each of the plurality of ITEs (e.g., blade servers (124)) within example computing system (102) may include a dedicated cryptoprocessor. As described in more detail above, each dedicated cryptoprocessor may be of a different type.

The computing system (102) of FIG. 1 also includes one or more media trays (122). The one or more media trays (122) in FIG. 1 may house non-volatile memory media generally. A media tray (122) may typically include Compact Disc read-only media drives ("CD-ROM"), Digital Video Disc ROM drives ("DVD-ROM"), CD-RW drives, DVD-RW drives, floppy disk drives, and so on as will occur to those of skill in the art.

The arrangement of the chassis environment, network (101), and other devices making up the example computing system (102) illustrated in FIG. 1 are for explanation, not for limitation. Computing systems useful according to various embodiments of the present disclosure may include additional servers, routers, and other devices, not shown in FIG. 1, as will occur to those of skill in the art. Networks in such data processing systems may support many data communications protocols, including Transmission Control Protocol ("TCP"), Internet Protocol ("IP"), HyperText Transfer Protocol ("HTTP"), Wireless Access Protocol ("WAP"), Handheld Device Transport Protocol ("HDTP"), and others as will occur to those of skill in the art. Various embodiments of the present disclosure may be implemented on a variety of hardware platforms in addition to those illustrated in FIG. 1.

Figure 2:
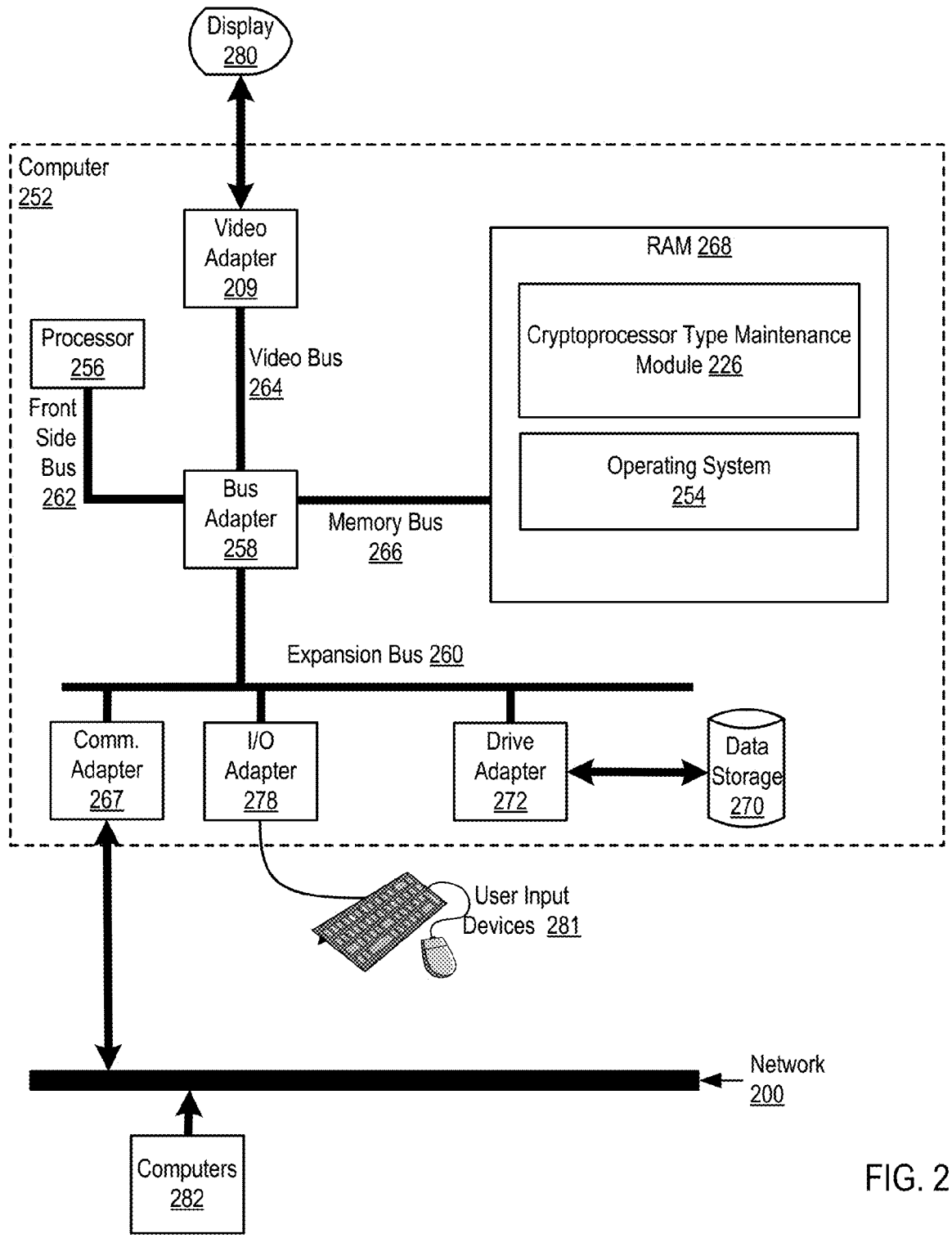
FIG. 2 sets forth a block diagram of automated computing machinery comprising an example computer useful for maintaining cryptoprocessor types in a multinode system in a computing system according to embodiments of the present disclosure.

For further explanation, FIG. 2 sets forth a block diagram of automated computing machinery comprising an example computer (252) useful for maintaining cryptoprocessor types in a multinode system in a computing system (102) according to embodiments of the present disclosure. The computing system (102) of FIG. 2 may be embodied, for example, as a blade server system that includes a plurality of ITEs and a plurality of power supplies. Each ITE may be embodied, for example, as a blade server, a blower, a network switch, a storage device, or any other power consuming component mounted within the computing system (102).

The computer (252) of FIG. 2 includes at least one computer processor (256) or "CPU" as well as random access memory ("RAM") (268) which is connected through a high speed memory bus (266) and bus adapter (258) to processor (256) and to other components of the computer (252). Stored in RAM (268) is a cryptoprocessor type maintenance module (226), a module of computer program instructions for maintaining cryptoprocessor types in a multinode system in a computing system (102) according to embodiments of the present disclosure.

The cryptoprocessor type maintenance module (226) may allow for maintaining cryptoprocessor types in a multinode system by receiving a selection of a first cryptoprocessor type; identifying, within a multinode system, a node having a cryptoprocessor of the first cryptoprocessor type; and designating the node having the cryptoprocessor of the first cryptoprocessor type as a primary node for the multinode system, as described in more detail below with reference to FIGS. 2-5.

The example computer (252) of may implement certain instructions stored on RAM (268) for execution by processor (256) for maintaining cryptoprocessor types in a multinode system. In some embodiments, receiving a selection of a cryptoprocessor type may be implemented as part of a larger set of executable instructions. For example, module (226) may be part of an overall boot management process. An overall boot management process may be responsible for determining which node to assign as the primary node in a multinode environment, as well as determining the operating system to run on that primary node. As noted above, certain known techniques for booting a multinode environment may result in unnecessary updates to a cryptoprocessor and/or the removal of other cryptoprocessor types. However, according to certain embodiments of the present disclosure, by maintaining cryptoprocessor types, flexibility may be increased.

Also stored in RAM (268) is an operating system (254). Operating systems useful in computers configured for maintaining cryptoprocessor types in a multinode system according to embodiments described herein include UNIX, Linux, Microsoft Windows, AIX, IBM's i5/OS, and others as will occur to those of skill in the art. The operating system (254), and cryptoprocessor type maintenance module (226) in the example of FIG. 2 are shown in RAM (268), but many components of such software typically are stored in non-volatile memory also, such as, for example, on a disk drive (270).

The example computer (252) of FIG. 2 also includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers configured for maintaining cryptoprocessor types in a multinode system according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (252) of FIG. 2 includes one or more input/output ("I/O") adapters (278). I/O adapters implement user-oriented input/output through, for example, software drivers and computer hardware for controlling output to display devices such as computer display screens, as well as user input from user input devices (181) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (164), bus adapter (258), and the front side bus (262), which is also a high speed bus.

The exemplary computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. In some embodiments, other computers (282) may include other ITEs of computer system (102) and/or system management module (152). Communications adapters implement the hardware level of data communications through which one computer sends data communications to another computer, directly or through a data communications network. Examples of communications adapters useful in computers configured for maintaining cryptoprocessor types in a multinode system according to embodiments described herein include modems for wired dial-up communications, Ethernet (IEEE 802.3) adapters for wired data communications, and 802.11 adapters for wireless data communications.

Figure 3:
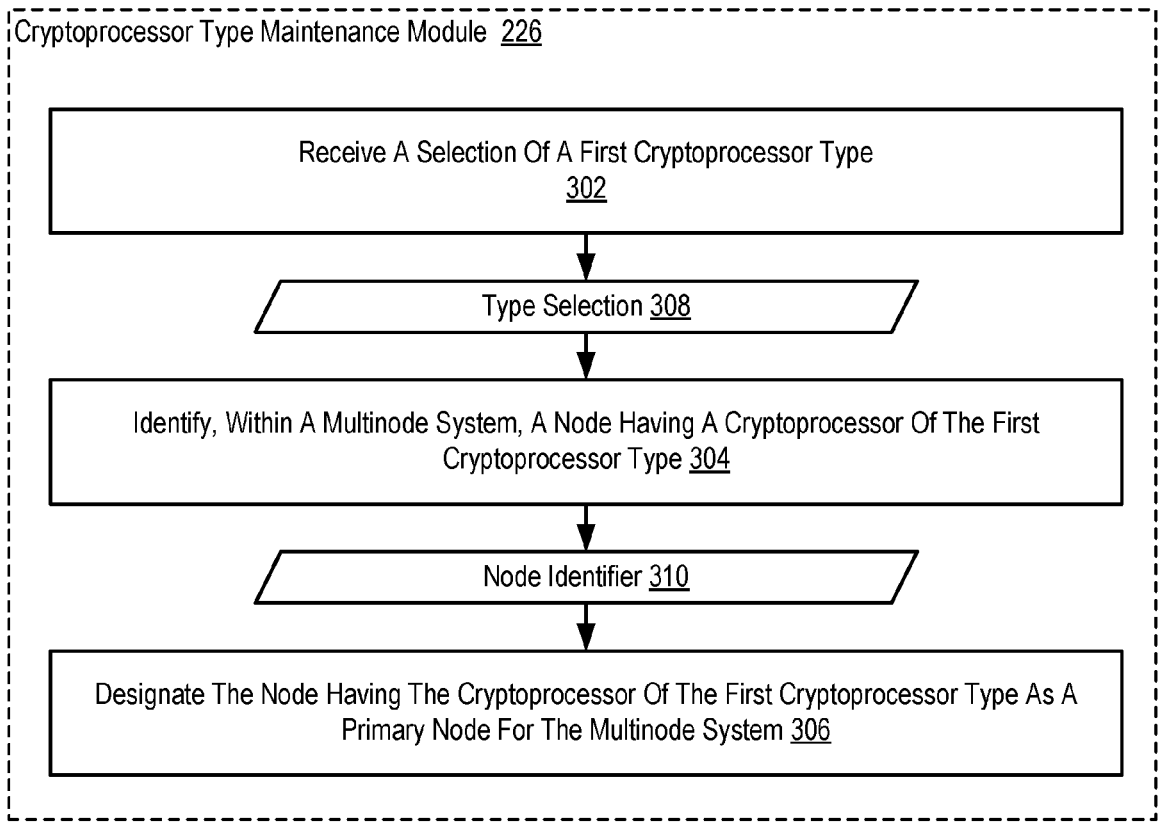
FIG. 3 sets forth a flow chart illustrating an exemplary method for performing maintaining cryptoprocessor types in a multinode system according to certain embodiments of the present disclosure.

For further explanation, FIG. 3 sets forth a flow chart illustrating another example method for performing maintaining cryptoprocessor types in a multinode system according to certain embodiments of the present disclosure. Generally, the example method of FIG. 3 may be performed by a cryptoprocessor type maintenance module (226) such as that shown in the example of FIG. 2.

The example method illustrated in FIG. 3 includes receiving (302) a selection (308) of a cryptoprocessor type. Receiving (302) a selection of a cryptoprocessor type may be carried out in a variety of ways, including receiving a selection from a user of the particular cryptoprocessor type through a UEFI or BIOS setting, receiving a selection from a user of particular cryptoprocessor criteria and inferring the type from the criteria, and so on as will occur to readers of skill in the art. In embodiments in which the module (226) receives a selection from a user where the selection is of the particular cryptoprocessor type, the user may be prompted during a boot process to make such a selection or the user may provide single security profile that sets forth such a cryptoprocessor type selection where the profile is installed once and utilized many times In embodiments in which the module (226) receives a selection from a user of cryptoprocessor criteria, the user may provide a set of security standards which the cryptoprocessor of a node must meet in order for the node to be designated as a primary node. Thus, the module (226) may infer a particular cryptoprocessor type that meets the criteria. In some embodiments, multiple different cryptoprocessor types may meet the criteria. As such, the user's criteria may also specify other attributes for selection of a primary node.

Receiving (302) a selection of a first cryptoprocessor type may be carried out manually by a user during a boot process, automatically as part of a boot process, or in other ways as will occur to readers of skill in the art. As described in more detail above with reference to FIGS. 1-2, in certain known boot processes, the selection of cryptoprocessor type may be automatic and mandated (e.g., a cryptoprocessor may be automatically upgraded from TPM v1.2 to TPM v2 as part of an update run from a shell script or from an operating system). In certain embodiments of the present disclosure, the selection of cryptoprocessor type is not automatic and may be based on a variety of design criteria, including performance characteristics of a particular node.

Further, in certain known boot processes, the selection of a primary node may be based on certain criteria unrelated to cryptoprocessor type. For example, primary node selection may be based on failover criteria. By contrast, in certain embodiments of the present disclosure, the selection of a primary node may be made based on user-defined security criteria such as the desired cryptoprocessor type. The cryptoprocessor type selection may be based on a variety of criteria, including security criteria. For example, the operating system-firmware interface (e.g., BIOS, UEFI, etc.) may interrogate all nodes and assess which has maximum security. The maximum security node may then be selected as primary. In some embodiments, the security criteria may take into account more than the cryptoprocessor type. For example, a node may be preferred that includes additional security measures such as Trusted Execution Technology ("TXT"), included on certain INTEL™ processors.

The method of FIG. 3 also includes identifying (304), within a multinode system, a node (310) having a cryptoprocessor of the first cryptoprocessor type. Identifying (304) a node (310) having a cryptoprocessor of the first cryptoprocessor type may be carried out in a variety of ways. For example, such an identification may be carried out by an operating system-firmware interface (e.g., basic input/output system ("BIOS"), unified extensible firmware interface ("UEFI"), etc.) interrogating each node in the multinode system (or a subset of nodes identified as potential primary nodes) to determine a cryptoprocessor type for each node (or each of the subset of nodes).

In some embodiments, if multiple nodes in the multinode system have the same cryptoprocessor type, one of the nodes may be migrated to a different cryptoprocessor type. In some configurations, such a migration may be undertaken to ensure that the migrated-to cryptoprocessor type is different from that of the current primary node. For example, if the current primary node has a cryptoprocessor type of TPM v2, and all interrogated nodes also have a cryptoprocessor type of TPM v2, then one node may be migrated to a different cryptoprocessor type (e.g., TPM v1.2).

In some embodiments, as a result of migrating to a different cryptoprocessor type, there may be side effects associated with changes to the operating system of the migrated node. In some configurations, the boot order may be changed on the migrated node to continue to boot from the operating system that was active before the migration.

The method of FIG. 3 also includes designating (306) the node having the cryptoprocessor of the first cryptoprocessor type as a primary node for the multinode system. Once the primary node has been first, the identity of the primary node may be stored in RAM (268) for further use by example computer (252). For example, the identity of the selected primary node may be referred to as the "primary node identifier" and in some embodiments may be stored as one or more values in RAM (268). Such a primary node identifier may include an identifier associated with an ITE such as a blade server or an identity of virtual machine to be designated as a primary node. Such an identity may include an IP address, a MAC (media access control') address, and the like of the primary node. In the same or alternative embodiments, a primary node identifier may include an identifier associated with the cryptoprocessor type of the primary node.

Although certain processes are illustrated with respect to FIG. 3, other processes may be included without departing from the scope of the present disclosure. For explanation, therefore, FIG. 4 sets forth a flow chart illustrating another example method for performing maintaining cryptoprocessor types in a multinode system according to certain embodiments of the present disclosure. The example method illustrated in FIG. 4 is similar to the method of FIG. 3 in that the method of FIG. 4 also includes receiving (302) a selection of a first cryptoprocessor type; identifying (304), within a multinode system, a node having a cryptoprocessor of the first cryptoprocessor type; and designating (306) the node having the cryptoprocessor of the first cryptoprocessor type as a primary node for the multinode system.

Figure 4:
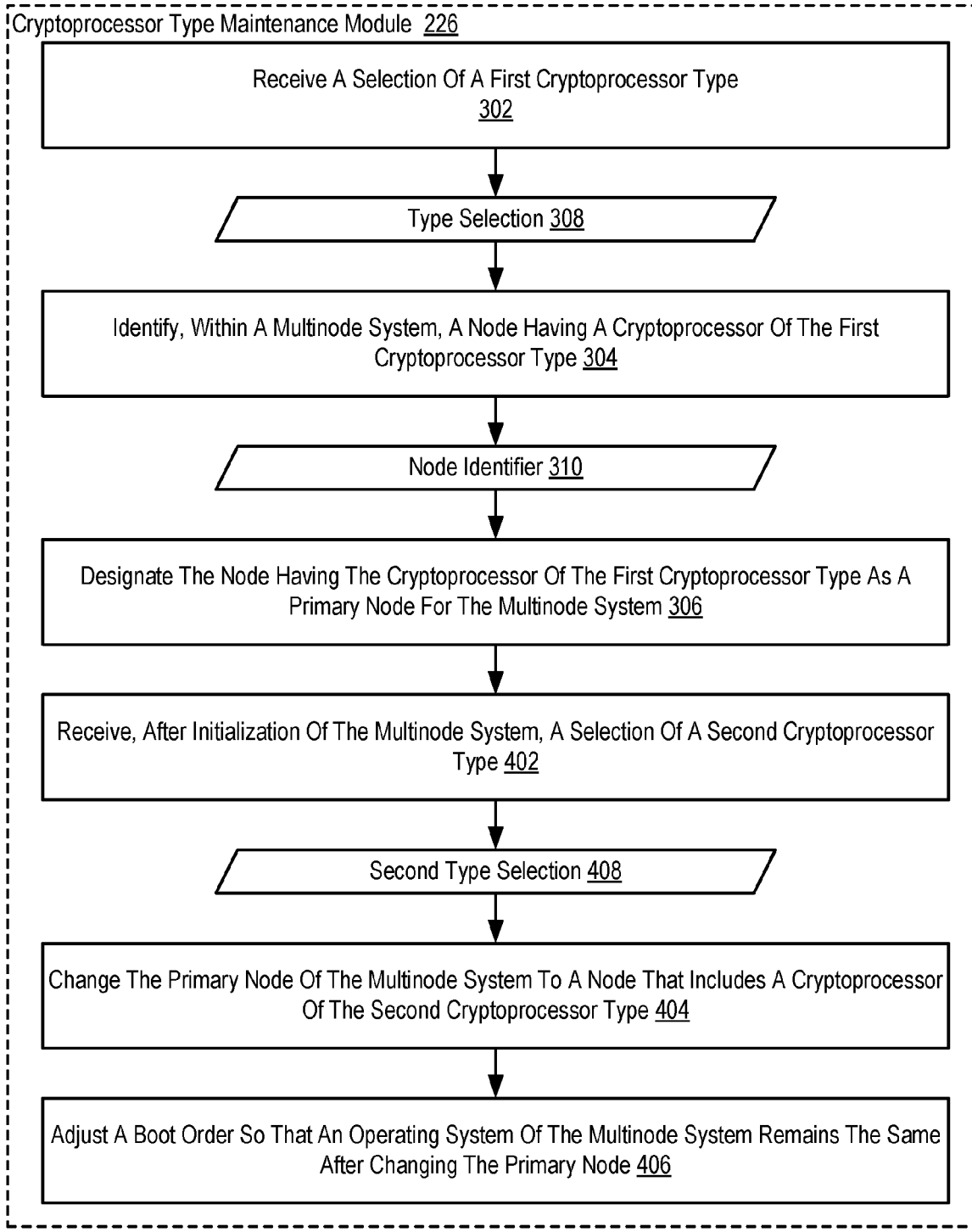
FIG. 4 sets forth a flow chart illustrating another example method for performing maintaining cryptoprocessor types in a multinode system according to certain embodiments of the present disclosure.

The example method of FIG. 4 differs from the method of FIG. 3, however, in that the method of FIG. 4 also includes, after initializing the multinode system, receiving (402) a second selection (308) of a second cryptoprocessor type. That is, after the initial selection of a first cryptoprocessor type and after the multinode system has been booted such that the primary node includes a cryptoprocessor of the first cryptoprocessor type, a second selection may be received of a second, different cryptoprocessor type.

Responsive to receiving such a second selection, the method of FIG. 4 continues by changing (404) the primary node of the multinode system to a node that includes a cryptoprocessor of the second cryptoprocessor type. Generally, the example method of FIG. 3 may be performed by cryptoprocessor type maintenance module (226) of example computer (252). For example, a user may wish to initialize the system with a primary node having a cryptoprocessor type of TPM v1.2. After some period of time, the user may wish to change the operation of the multinode system to a second cryptoprocessor type of TPM v2. As an alternative example, a user may wish to initialize the system with a cryptoprocessor type of TPM v2. After some period of time, the user may wish to change the operation of the multinode system to a second cryptoprocessor type of TCM. In certain embodiments of the present disclosure, this change may be implemented while maintaining other cryptoprocessor types within the multinode system.

The example method illustrated in FIG. 4 also includes adjusting (406) a boot order so that an operating system of the multinode system remains the same after changing the primary node. As a result of migrating to a different cryptoprocessor type, a multinode system may have side effects associated with changes to the operating system of the migrated node. In some configurations, the boot order may be changed on the migrated node to continue to boot from the operating system that was active before the migration.

Figure 5:
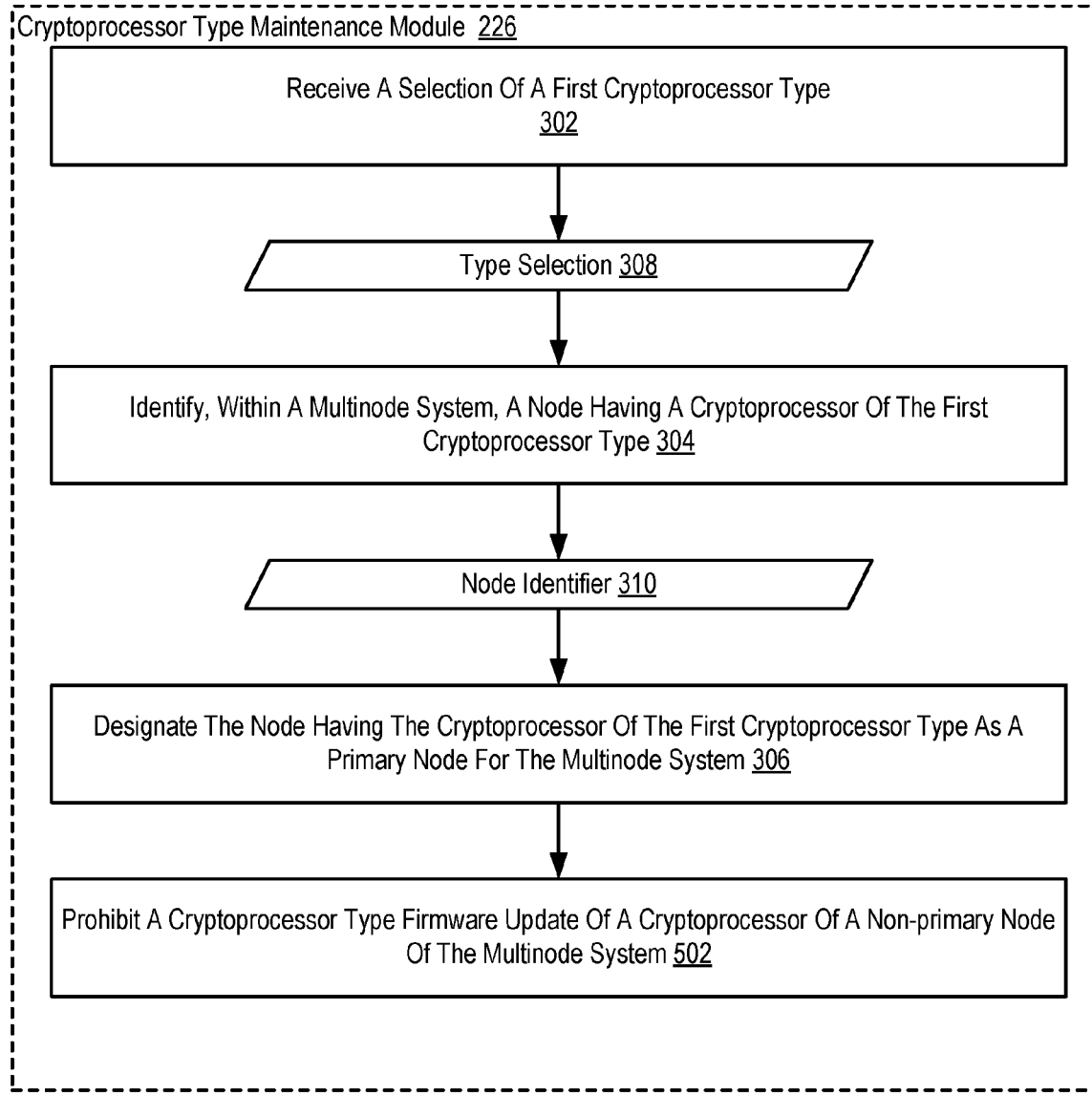
FIG. 5 sets forth a flow chart illustrating another example method for performing maintaining cryptoprocessor types in a multinode system according to certain embodiments of the present disclosure.

For further explanation, FIG. 5 sets forth a flow chart illustrating another example method for performing maintaining cryptoprocessor types in a multinode system according to certain embodiments of the present disclosure. The example method illustrated in FIG. 5 is similar to the method of FIG. 3 in that the method of FIG. 5 also includes receiving (302) a selection of a first cryptoprocessor type; identifying (304), within a multinode system, a node having a cryptoprocessor of the first cryptoprocessor type; and designating (306) the node having the cryptoprocessor of the first cryptoprocessor type as a primary node for the multinode system.

The method of FIG. 5 differs from the method of FIG. 3, however, in that the method of FIG. 5 also includes prohibiting (502) a cryptoprocessor type firmware update of a cryptoprocessor of a non-primary node of the multinode system. Generally, the example method of FIG. 3 may be performed by cryptoprocessor type maintenance module (226) of example computer (252).

Prohibiting (502) the cryptoprocessor type firmware update may include, in some embodiments, managing the firmware updates of various nodes in order to ensure the integrity of the component memory. Given the nature and function of cryptographic processors, the manufacturer or vendor of a cryptoprocessor may limit the number of updates. To reduce the possibility of a cryptoprocessor of a single node being updated to the maximum number of allowable updates, a system administrator may limit the number and types of updates to a cryptoprocessor in the multinode system. In such a configuration, a multinode system may include nodes with different cryptoprocessor types. In other configurations, different cryptoprocessor types may be present due to inclusion of nodes with different origin cryptoprocessor types (e.g., a node with TPM v2 and a node with TCM).

In multinode systems including different cryptoprocessor types, certain known multinode management processes make use only of the cryptoprocessor type of the primary node, where the primary node is chosen based on criteria other than the type of cryptoprocessor included in the primary node. If the type of the cryptoprocessor of the primary node fails to meet certain criteria, then the cryptoprocessor type of the primary node may be changed (e.g., if the primary node has a cryptoprocessor type of TPM v1.2, the cryptoprocessor may be upgraded to TPM v2). Such configurations give no thought to retaining other cryptoprocessor types in a multinode system.

As multinode systems increase in size and deployment, different types of nodes may be included in a multinode system with different nodes having different cryptoprocessor types. By maintaining cryptoprocessor types in a multinode environment, multinode systems maintain flexibility for future use while protecting cryptoprocessors from unnecessary (or prohibited) upgrades.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   by first program instructions executing on a computing system:
   receiving a selection of a first cryptoprocessor type; and
   identifying and designating as a primary node a node within a multinode system having a cryptoprocessor of the first cryptoprocessor type; and
   prohibiting a cryptoprocessor type firmware update of a cryptoprocessor of a non-primary node of the multinode system.

2. The method of claim 1, wherein the cryptoprocessor type is selected from the group consisting of: a first version of trusted platform module ("TPM"), a second version of TPM, or trusted cryptography module ("TCM").

3. The method of claim 1, further comprising:
   receiving, after initialization of the multinode system, a selection of a second cryptoprocessor type; and responsive to receiving the second selection, changing the primary node of the multinode system to a node that includes a cryptoprocessor of the second cryptoprocessor type.

4. The method of claim 3, further comprising adjusting a boot order so that an operating system of the multinode system remains the same after changing the primary node.

5. The method of claim 1, wherein the selection is based at least on a security level of the first cryptoprocessor type and a security level of a second cryptoprocessor type.

6. An apparatus comprising a computer processor and a computer memory operatively coupled to the computer processor, the computer memory having disposed within it computer program instructions that, when executed by the computer processor, cause the apparatus to carry out the steps of:
  receiving a selection of a first cryptoprocessor type; and
  identifying and designating as a primary node a node within a multinode system having a cryptoprocessor of the first cryptoprocessor type; and
  prohibiting a cryptoprocessor type firmware update of a cryptoprocessor of a non-primary node of the multinode system.

7. The apparatus of claim 6, wherein the cryptoprocessor type is selected from the group consisting of: a first version of trusted platform module ("TPM"), a second version of TPM, or trusted cryptography module ("TCM").

8. The apparatus of claim 6, further comprising computer program instructions that, when executed by the computer processor, cause the apparatus to carry out the steps of:
  receiving, after initialization of the multinode system, a selection of a second cryptoprocessor type; and
  responsive to receiving the second selection, changing the primary node of the multinode system to a node that includes a cryptoprocessor of the second cryptoprocessor type.

9. The apparatus of claim 8, further comprising computer program instructions that, when executed by the computer processor, cause the apparatus to carry out the step of adjusting a boot order so that an operating system of the multinode system remains the same after changing the primary node.

10. The apparatus of claim 6, wherein the selection is based at least on a security level of the first cryptoprocessor type and a security level of a second cryptoprocessor type.

11. A computer program product comprising a non-transitory computer readable medium, the computer readable medium comprising computer program instructions that, when executed, cause a computer to carry out the steps of:
  receiving a selection of a first cryptoprocessor type; and
  identifying and designating as a primary node a node within a multinode system having a cryptoprocessor of the first cryptoprocessor type; and
  prohibiting a cryptoprocessor type firmware update of a cryptoprocessor of a non-primary node of the multinode system.

12. The computer program product of claim 11, wherein the cryptoprocessor type is selected from the group consisting of: a first version of trusted platform module ("TPM"), a second version of TPM, or trusted cryptography module ("TCM").

13. The computer program product of claim 11, further comprising computer program instructions that, when executed, cause the computer to carry out the steps of:
  receiving, after initialization of the multinode system, a selection of a second cryptoprocessor type; and
  responsive to receiving the second selection, changing the primary node of the multinode system to a node that includes a cryptoprocessor of the second cryptoprocessor type.

14. The computer program product of claim 13, further comprising computer program instructions that, when executed, cause the computer to carry out the step of adjusting a boot order so that an operating system of the multinode system remains the same after changing the primary node.

15. The computer program product of claim 11, wherein the selection is based at least on a security level of the first cryptoprocessor type and a security level of a second cryptoprocessor type.

16. The computer program product of claim 11 wherein the computer readable medium comprises a storage medium.

* * * * *